C. W. YELM.
SPREADER FOR ROAD CONSTRUCTION.
APPLICATION FILED DEC. 16, 1918.

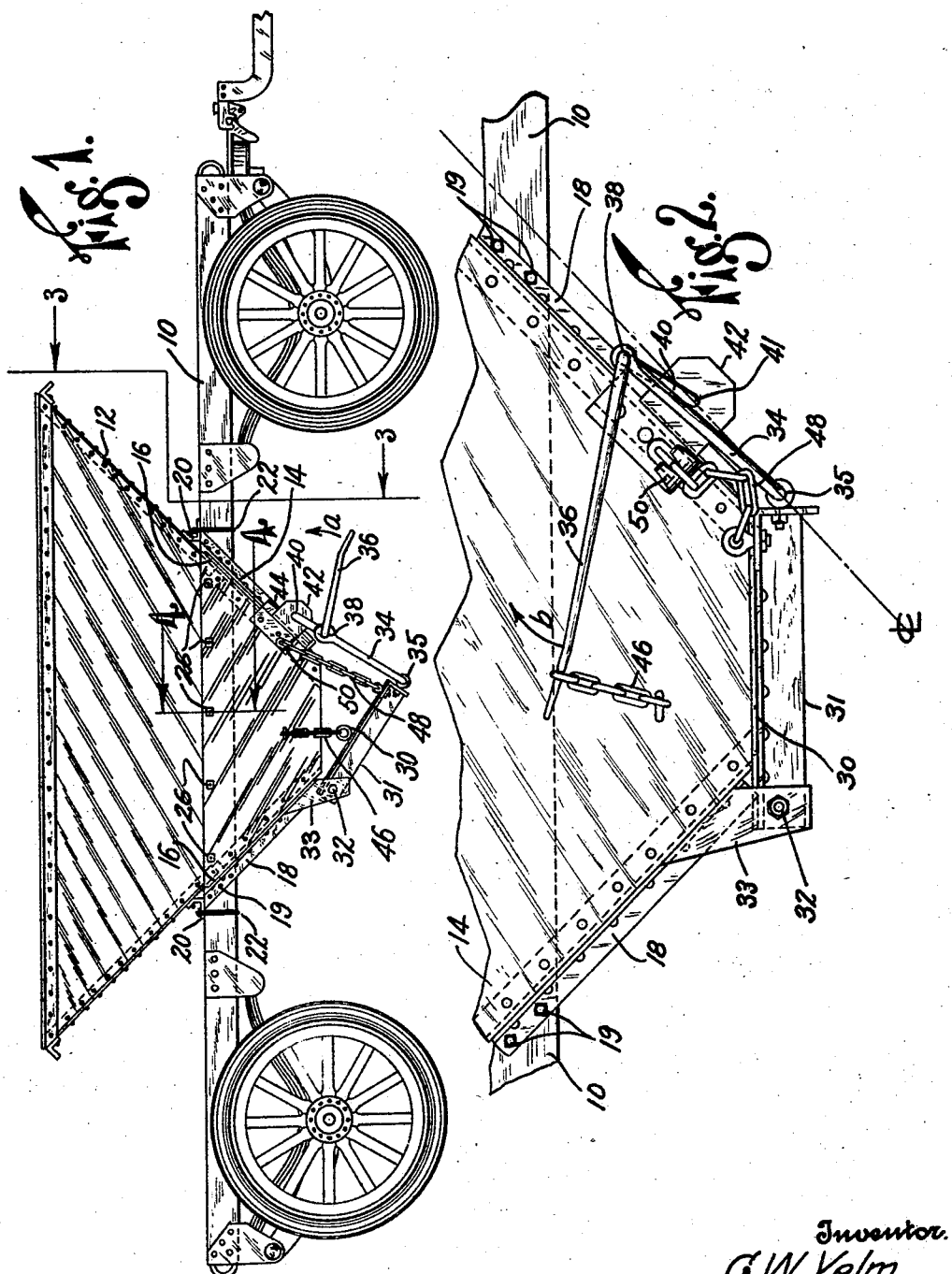

1,417,709.

Patented May 30, 1922.
2 SHEETS—SHEET 2.

Inventor
C. W. Yelm.

UNITED STATES PATENT OFFICE.

CHARLES W. YELM, OF DENVER, COLORADO, ASSIGNOR OF ONE-HALF TO MAURICE G. KIRKPATRICK, OF DENVER, COLORADO.

SPREADER FOR ROAD CONSTRUCTION.

1,417,709.   Specification of Letters Patent.   Patented May 30, 1922.

Application filed December 16, 1918. Serial No. 267,064.

*To all whom it may concern:*

Be it known that I, CHARLES W. YELM, a citizen of the United States, residing at No. 4035 East 18th Avenue, in the city and county of Denver and State of Colorado, have invented certain new and useful Improvements in Spreaders for Road Construction; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to spreaders for surfacing material for roads. The object of the invention is the provision of a spreader, or spreading hopper whose width is not limited by the width of the chassis or the tread of the vehicle on which it is mounted but is greater than the width of the chassis frame and is independent thereof, and part of which may be removed to clean the top of the chassis of the vehicle to take timbers or the like for transport or to take a truck body. The invention also seeks to provide a simple and efficient discharge gate.

Briefly, the invention comprises a vehicle having a chassis upon which a two part hopper is mounted. The top of the lower part is flush with the top of the chassis rails, and the upper part fits the lower part but is removably connected therewith and with the chassis. The width of the hopper is greater than the width of the vehicle, so that half the width of a road or even the entire width of a narrow road may be treated in one operation. The gate is constructed with a link and lever so that the weight of the load helps to maintain the gate closed; an adjustable connection is provided on the gate to vary the size of the throat during spreading.

In the drawings:

Fig. 1 is a side elevation showing the hopper mounted on a chassis, the gate being open.

Fig. 2 is a side elevation of a fragment of Fig. 1 and on a larger scale showing the gate closed.

Figure 3:
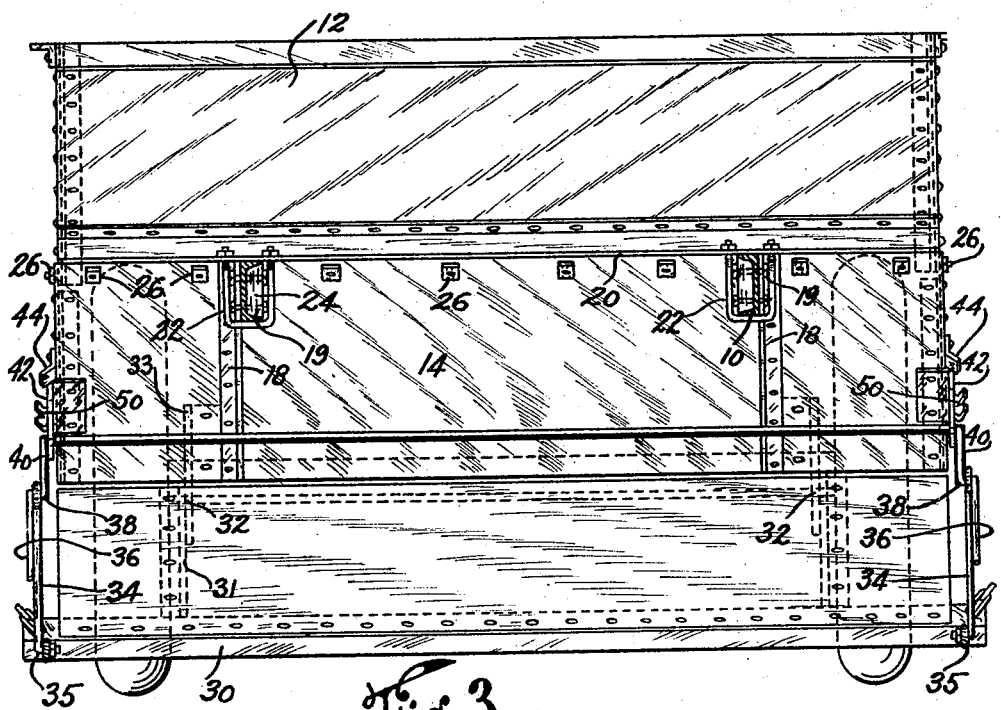
Fig. 3 is in general an end elevation as indicated by line 3—3 of Fig. 1.
Figure 4:
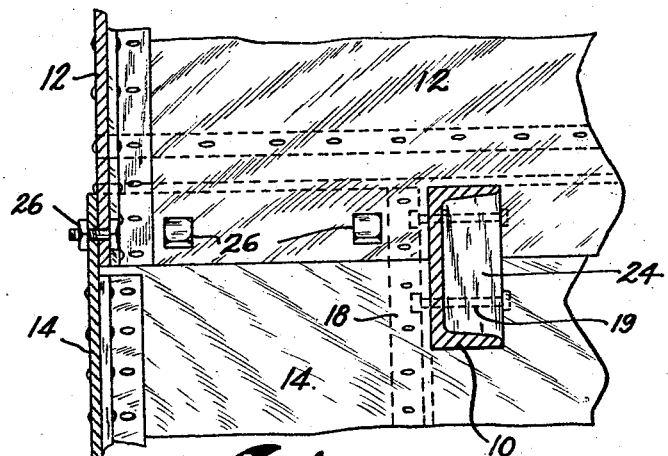
Fig. 4 is a fragmentary vertical sectional view indicated by line 4—4 of Fig. 1.

The hopper is mounted upon the channel bars 10 of the chassis, between the front and rear wheels, and is composed of an upper part 12, and a lower part 14, the two parts overlapping at 16. The chassis bars 10 extend through slots in the upper edge of the lower hopper part 14. This part is mounted on the chassis by means of angle irons 18 riveted to the hopper and secured to the chassis bars 10 by bolts 19. The upper hopper member 12 fits in the lower member and is provided with angle or channel irons 20 riveted thereto, which rest on the chassis bars, and are removably secured thereto by U bolts 22, which pass around the chassis bars. Thus the width of the hopper is greater than the width of the chassis and is independent thereof.

To prevent loss of materials through the channels of bars 10, fillers 24 are provided. The walls of the two hopper members are bolted together at intervals by removable bolts 26.

Thus it will be seen, that by removing the bolts 24 and the U-bolts 22, the upper hopper member may be easily removed, whereupon timbers may be chained to the chassis or a truck or wagon body mounted thereon for the transport of materials or tools.

The gate 30 has cross beams 31 which are hingedly connected at 32 to angle plates 33 on the hopper. At the forward edge of the gate a link 34 is pivoted as indicated at 35, this link engaging an angle lever 36 at the offset 38 therein, and the arm 40 of said lever being pivoted at 41 in plate 42 mounted on the hopper. A stop 44 is struck up from plate 42 and interposed in the path of arm 40 to limit its motion in the direction of the small arrow *a* of Fig. 1 when the gate is being closed. When the gate is in closed position and the arm 40 is in engagement with stop 44, the point 38 of lever 36 is in a position beyond the dead center of pivots 35 and 41 indicated by the "center line" in Fig. 2. Thus the weight of the load tends to draw the arm 40 into firmer engagement with stop 44. To avoid accidents, a short chain 46 or the like may be secured to the hopper to slip over the end of lever 36. To regulate the size of the throat when the gate is open, a chain 48 or the like is connected to the gate and its links are adapted to be adjustably engaged by the claw 50 formed on the plate 42.

The gate is opened by releasing chain 46 and swinging lever 36 in the direction of small arrow *b* of Fig. 2, and is closed by swinging it in the direction of small arrow *a* of Fig. 1.

I claim:

1. In a spreader, the combination with a chassis having wheels, said chassis having side supporting rails, of a hopper upon the chassis positioned between the front and rear wheels and extending above and below and beyond the side rails, said side rails passing through the hopper walls and through the carrying space therewithin and spaced substantially from the side walls of said hopper, the width of the hopper being independent of the width of the chassis, said hopper being carried and supported directly by said side rails.

2. In a spreader, the combination with a chassis of a hopper mounted upon the chasis, the hopper comprising an upper member and a lower member, the lower member being secured to the chassis and the upper hopper member being removably secured to the chassis and to the lower member.

3. In a spreader, the combination with a chassis having side supporting rails, of a hopper on the chassis, the side rails of the chassis extending through the walls of the hopper, said side rails being secured to said hopper and directly and solely supporting said hopper.

4. In a spreader, the combination with a chassis having side rails, of a hopper mounted on the chassis, the hopper comprising an upper member and lower member, the upper member being removably mounted on the chassis and on the lower member, the side rails of the chassis passing through the lower member and being secured thereto.

5. In a spreader, a chassis, a hopper thereon, a gate at the bottom of the hopper, means to release one side of the gate and adjustable means to control the extent of the opening of the gate whereby the opening of said gate may be predetermined, said means comprising a hook secured to the hopper and a chain secured to the gate, a lever pivotally connected to said hopper, a rod connecting said lever to said gate and means to hold the lever in position with the gate closed.

6. In a spreader, a chassis, a hopper thereon, a gate at the bottom of the hopper, means to release one side of the gate and adjustable means to control the extent of the opening of the gate whereby the opening of said gate may be predetermined, said means comprising a hook secured to the hopper and a chain secured to the gate, a lever pivotally connected to said hopper and having an offset portion forming a crank, a rod connecting said crank to said gate whereby the latter is opened and closed by the lever when it rotates about its pivots and means to lock said gate in closed position.

In testimony whereof I affix my signature.

CHARLES W. YELM.